US011589226B2

(12) United States Patent
Patil et al.

(10) Patent No.: US 11,589,226 B2
(45) Date of Patent: Feb. 21, 2023

(54) MULTI-FACTOR AUTHENTICATION FOR MOBILE SECURITY PROTOCOL

(71) Applicant: Cisco Technology, Inc., San Jose, CA (US)

(72) Inventors: Prashanth Patil, San Jose, CA (US); Ram Mohan Ravindranath, Karnataka (IN); Rajesh Indira Viswambharan, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 68 days.

(21) Appl. No.: 16/716,786

(22) Filed: Dec. 17, 2019

(65) Prior Publication Data
US 2021/0185529 A1   Jun. 17, 2021

(51) Int. Cl.
*H04L 29/06* (2006.01)
*H04W 12/06* (2021.01)
(Continued)

(52) U.S. Cl.
CPC ......... *H04W 12/068* (2021.01); *H04L 9/0844* (2013.01); *H04L 12/2814* (2013.01);
(Continued)

(58) Field of Classification Search
CPC ... H04W 12/068; H04W 12/67; H04W 12/37; H04W 12/0431; H04W 12/08;
(Continued)

(56) References Cited

U.S. PATENT DOCUMENTS 9,626,520 B2    4/2017  Sharp et al.
2016/0127896 A1*  5/2016  Lee ..................... H04W 12/041
                                              455/411

(Continued)

FOREIGN PATENT DOCUMENTS

WO    2018/013925 A1    1/2018
WO    2018/053271 A1    3/2018

OTHER PUBLICATIONS

ETSI TS 129 503 V15.2.1, 5G; 5G System; Unified Data Management Services; Stage 3 (3GPP TS 29.503 version 15.2.1 Release 15) https://www.etsi.org/deliver/etsi_ts/129500_129599/129503/15.02.01_60/ts_129503v150201p.pdf (Year: 2019).*

(Continued)

*Primary Examiner* — Carl G Colin
*Assistant Examiner* — Andrew Suh
(74) *Attorney, Agent, or Firm* — Edell, Shapiro & Finnan, LLC

(57) ABSTRACT

In one example, a home network associated with a user equipment obtains an authentication request to authenticate the user equipment to a serving network. The home network generates an authentication vector of a mobile security protocol. The authentication vector includes an indication that the user equipment is to be authenticated using a multi-factor authentication process. The home network provides the authentication vector to the serving network to prompt a response from the user equipment that is in accordance with the multi-factor authentication process. The home network authenticates the user equipment to the serving network based on the response.

20 Claims, 5 Drawing Sheets

(51) Int. Cl.
  *H04W 12/08*   (2021.01)
  *H04L 9/40*    (2022.01)
  *H04L 9/08*    (2006.01)
  *H04W 8/04*    (2009.01)
  *H04L 12/28*   (2006.01)
  *H04W 12/37*   (2021.01)
  *H04W 12/67*   (2021.01)
  *H04W 12/0431* (2021.01)

(52) U.S. Cl.
  CPC ........ *H04L 63/0807* (2013.01); *H04L 63/105* (2013.01); *H04W 8/04* (2013.01); *H04W 12/0431* (2021.01); *H04W 12/08* (2013.01); *H04W 12/37* (2021.01); *H04W 12/67* (2021.01); *H04L 2463/082* (2013.01)

(58) Field of Classification Search
  CPC ...... H04W 8/04; H04W 12/06; H04L 9/0844; H04L 12/2814; H04L 63/0807; H04L 63/105; H04L 2463/082; H04L 2012/2841; H04L 2209/80; H04L 9/3213; H04L 9/3226; H04L 9/3228; H04L 12/2818; H04L 63/08; H04L 9/0825
  See application file for complete search history.

(56) References Cited

U.S. PATENT DOCUMENTS

| | | | | |
|---|---|---|---|---|
| 2016/0262021 | A1* | 9/2016 | Lee | H04W 12/06 |
| 2017/0289118 | A1* | 10/2017 | Khosravi | H04W 12/06 |
| 2018/0232937 | A1* | 8/2018 | Moyer | A63F 13/65 |
| 2019/0053300 | A1 | 2/2019 | Kaliaperumal | |
| 2019/0141081 | A1* | 5/2019 | Kunz | H04W 12/08 |
| 2020/0053072 | A1* | 2/2020 | Glozman | H04L 63/0869 |

OTHER PUBLICATIONS 4G and 5G networks security techniques and algorithms, ITU PITA Workshop https://www.itu.int/en/ITU-D/Regional-Presence/AsiaPacific/SiteAssets/Pages/Events/2019/ITUPITA2018/ITU-ASP-CoE-Training-on-/4G%20and%205G%20network%20security%20techniques%20and%20algorithms.pdf (Year: 2018).*

ETSI TS 133 501 V15.2.0, 5G; Security architecture and procedures for 5G System (3GPP TS 33.501 version 15.2.0 Release 15) https://www.etsi.org/deliver/etsi_ts/133500_133599/133501/15.02.00_60/ts_133501v150200p.pdf (Year: 2018).*

ITU-T X.1158, Series X: Data Networks, Open System Communications and Security https://www.itu.int/rec/T-REC-X.1158-201411-I/en (Year: 2014).*

Arkko et al., "A USIM compatible 5G AKA protocol with perfect forward secrecy", 2015 IEEE Trustcom/BigDataSE/ISPA. vol. 1. IEEE, 2015, 5 pages.

3GPP, "5G; Security architecture and procedures for 5G System (3GPP TS 33.501 version 15.2.0 Release 15)", ETSI TS 133 501 V15.2.0 (Oct. 2018), 172 pages.

Khan et al., "Identity Confidentiality in 5G Mobile Telephony Systems", International Conference on Research in Security Standardisation. Springer, Cham, 2018, 15 pages.

Prasad et al., "3GPP 5G Security", Journal of ICT Standardization 6.1, 2018, pp. 137-158.

Prasad et al., "The Mobile Broadband Standard", 3GPP 5G Security, Aug. 6, 2018, 4 pages.

Cisco, "Configuring WPA2-Enterprise with Google Auth", Cisco Meraki, downloaded from the Internet Sep. 12, 2019, 3 pages.

CableLabs, "A Comparative Introduction to 4G and 5G Authentication", Informed Insights CableLabs, downloaded from the Internet Sep. 10, 2019, 19 pages.

Shah et al., "Multi-Factor Authentication as a Service", 2015 3rd IEEE International Conference on Mobile Cloud Computing, Services, and Engineering, 2015, 9 pages.

* cited by examiner

US 11,589,226 B2

MULTI-FACTOR AUTHENTICATION FOR MOBILE SECURITY PROTOCOL

TECHNICAL FIELD

The present disclosure relates to telecommunication networks.

BACKGROUND

"5G" refers to fifth generation cellular network technology. 5G may offer improved speed, latency, and efficiency over earlier-generation cellular network technologies. 5G networks may be public networks (available for any user) or private networks (limited to certain users, such as employees of an enterprise). Private 5G networks promise to replace wired industrial Ethernet links with ultra-reliable and ultra-low latency 5G New Radio (NR) links.

DESCRIPTION OF EXAMPLE EMBODIMENTS

Overview

In one example embodiment, a home network associated with a user equipment obtains an authentication request to authenticate the user equipment to a serving network. The home network generates an authentication vector of a mobile security protocol. The authentication vector includes an indication that the user equipment is to be authenticated using a multi-factor authentication process. The home network provides the authentication vector to the serving network to prompt a response from the user equipment that is in accordance with the multi-factor authentication process. The home network authenticates the user equipment to the serving network based on the response.

Example Embodiments

Figure 1:
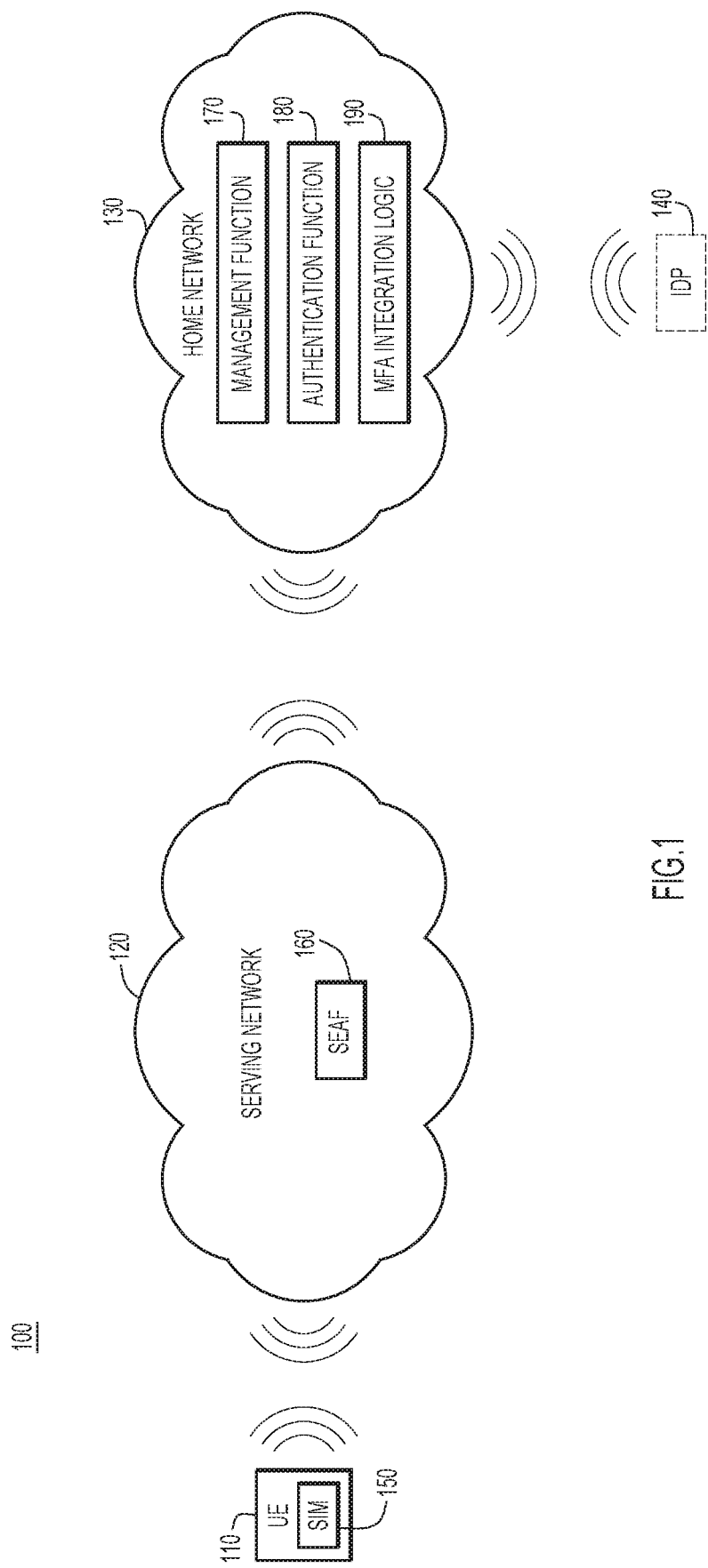
FIG. 1 illustrates a system configured to integrate Multi-Factor Authentication (MFA) with a mobile security protocol, according to an example embodiment.

FIG. 1 illustrates an example system 100 configured to integrate Multi-Factor Authentication (MFA) with a mobile security protocol. System 100 includes a User Equipment (UE) 110, serving network 120, home network 130, and, optionally, an Identity Provider (IDP) 140. UE 110 may be any suitable user device such as a mobile phone or laptop, and may include Subscriber Identity Module (SIM) 150. SIM 150 may be any suitable SIM entity configured to store subscriber-related information and implement security functions pertaining to authentication and ciphering on the user side. Examples of SIM 150 may include a Universal SIM (USIM), micro SIM, virtual SIM, SIM card, Universal Integrated Circuit Card (UICC), etc.

Serving network 120 may include a Security Anchor Function (SEAF), which holds a root key (anchor key) on behalf of serving network 120. In one example, home network 130 is a private enterprise network and may include management function 170 and authentication function 180. Management function 170 may include a Unified Data Management (UDM) that supports an Authentication Credential Repository and Processing Function (ARPF) and a Subscription Identifier De-Concealing Function (SIDF). Authentication function 180 may include an Authentication Server Function (AUSF). IDP 140 may be any suitable IDP entity configured to facilitate MFA.

Conventionally, there are security concerns associated with using mobile security protocols (e.g., 5G mobile security protocols) for authentication. For example, the 5G-Authentication and Key Agreement (5G-AKA) protocol and the Extensible Authentication Protocol-AKA' (EAP-AKA') protocol are the primary authentication methods prescribed for the 5G authentication framework. The 5G-AKA and EAP-AKA' protocols currently only support single-factor authentication, which is more vulnerable to security breaches than MFA. Furthermore, the experience offered by over-the-top MFA solutions introduced using captive portals is often quite clumsy in operation. This is because after successful authentication, the user may be forced into a captive portal for MFA, which can lead to poor user experience including browser security issues such as HyperText Transfer Protocol Secure (HTTPS) interception, redirection failures, failure in launching captive portal, etc. Therefore, current mobile security protocols do not provide adequate authentication solutions, particularly in the 5G context.

Accordingly, MFA integration logic 190 is provided that causes home network 130 to seamlessly integrate MFA directly into mobile security protocols (e.g., 5G mobile security protocols such as 5G-AKA and EAP-AKA' for 5G authentication). In one example, home network 130 may obtain an authentication request to authenticate UE 110 to serving network 120 and generate an authentication vector of a mobile security protocol. The authentication vector includes an indication that UE 110 is to be authenticated using a MFA process. Home network 130 may provide the authentication vector to UE 110 to prompt a response that is in accordance with the MFA process, and authenticate UE 110 based on the response.

This integrated MFA solution may involve coordination between home network 130 and UE 110. In one example, home network 130 may provide an indication that UE 110 should prompt the user for an MFA response. Upon receiving this indication, UE 110 may prompt the user for the MFA response. Home network 130 may thereby accommodate MFA in the authentication flow. Optionally, home network 130 may integrate with IDP 140 to validate One-Time Passwords (OTPs) in order to tie the MFA into the authentication process.

It will be appreciated that any suitable MFA process now known or hereinafter developed may be utilized in accordance with the embodiments presented herein. MFA processes may use OTPs or derivatives thereof, selections of one or more user interface elements in a so-called "push" process, passcodes, security codes, challenges/responses, biometrics, QR codes, security tokens, magnetic stripe cards, smart cards, etc. MFA processes may involve sending and receiving information (e.g., OTPs) in-band and/or out-of-band via any suitable communication mechanism such as Short Message Service (SMS), electronic mail, or third-party applications (e.g., Google® Authenticator, Yubikey™, Cisco Systems, Inc.'s DUO® technology, etc.). In a further example, a user may associated an MFA tool/application with a service provider upon subscription.

Figure 2:
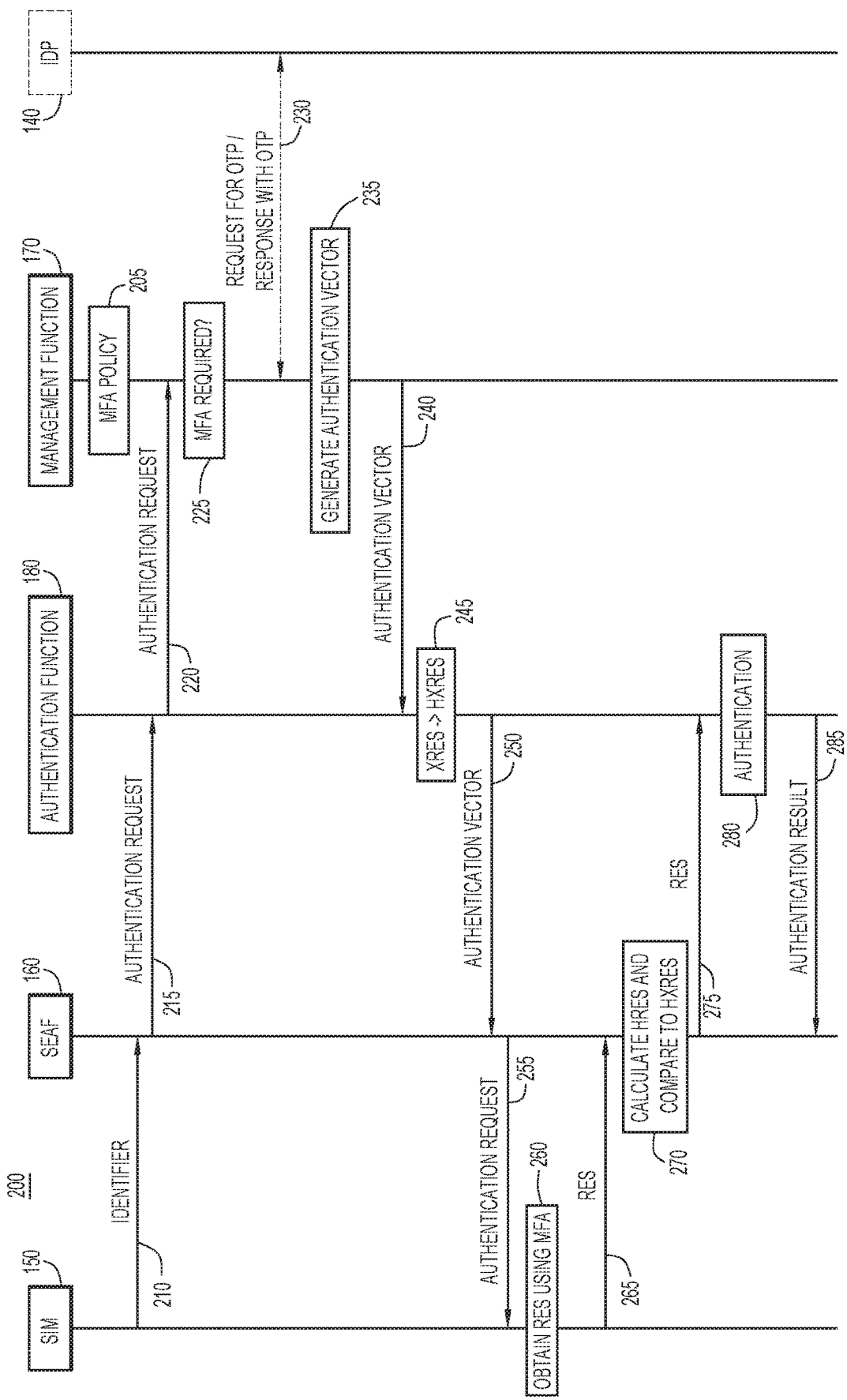
FIG. 2 illustrates a call flow for MFA integrated with 5G-Authentication and Key Agreement (5G-AKA) mobile security protocol, according to an example embodiment.

Turning now to FIG. 2, and with continued reference to FIG. 1, shown is an example call flow 200 for MFA integrated with the 5G-AKA mobile security protocol. At 205, an MFA policy is defined at management function 170. The MFA policy may be defined to management function 170 by the user of UE 110 (e.g., a subscriber) or a network administrator of home network 130 (e.g., a representative of the enterprise). The MFA policy may indicate when a MFA process is to be used to authenticate UE 110. The MFA process may operate on a per-UE basis, per-serving network basis, or any other suitable basis. In one example, the MFA policy may indicate that any UE that is associated with the enterprise is to be authenticated to serving network 120 using the MFA process. In another example, the MFA policy may indicate that any UE to be authenticated to serving network 120 is to be authenticated to serving network 120 using the MFA process. In still another example, the MFA policy may indicate that the UE is to be authenticated to serving network 120 using the MFA process at a given time or a given location.

After the MFA policy has been defined, UE 110 may enter serving network 120. At 210, SIM 150 provides, to SEAF 160, an identifier of UE 110. In one example, SIM 150 may provide an N1 message including a Subscription Concealed Identifier (SUCI) of UE 110. The SUCI is a concealed/encrypted identifier of UE 110 derived from the Subscription Permanent Identifier (SUPI) of UE 110. In order to protect the SUPI, SIM 150 may create the SUCI using an encryption scheme and provide the SUCI, rather than the SUPI, to the core network of serving network 120. The MFA policy may reference the SUPI or SUCI of UE 110 to control when the MFA process is used to authenticate UE 110 to serving network 120. It will be appreciated that any suitable identifier of UE 110 may be used in accordance with the techniques described herein, such as a Globally Unique Temporary Identifier (GUTI) (e.g., a 5G-GUTI), that may be used to protect the International Mobile Subscriber Identity (IMSI) of UE 110.

At 215, authentication function 180 obtains, from SEAF 160, an authentication request to authenticate UE 110 to serving network 120. The authentication request may include the SUCI, SUPI, and/or Serial Number Identifier (SNID) of UE 110. At 220, management function 170 obtains the authentication request from authentication function 180. At 225, management function 170 determines whether UE 110 is to be authenticated using the MFA process. If the authentication request includes the SUCI, management function 170 may de-conceal/decrypt the SUCI to obtain the SUPI. The SIDF, which is a service offered by the UDM in home network 130, may be responsible for de-concealing the SUPI from the SUCI. Management function 170 may further select the appropriate mobile security protocol (here, 5G-AKA).

At 225, based on the SUPI, 5G-AKA, and MFA policy, management function 170 may determine whether UE 110 is to be authenticated using the MFA process (e.g., whether to enforce the MFA on UE 110). For example, if the MFA policy indicates that any UE that is associated with the enterprise is to be authenticated to serving network 120 using the MFA process, management function 170 may determine that UE 110 is associated with the enterprise and that therefore the MFA process should be used. If the MFA policy indicates that any UE to be authenticated to serving network 120 is to be authenticated to serving network 120 using the MFA process, management function 170 may determine that UE 110 is to be authenticated to serving network 120 and that therefore the MFA process should be used. If the MFA policy indicates that the UE is to be authenticated to serving network 120 using the MFA process at a given time or a given location, management function 170 may determine that UE 110 is at the given time or the given location and that, therefore, the MFA process should be used.

In this example, management function 170 determines that UE 110 is to be authenticated using the MFA process and may initiate the MFA process. The MFA process used in call flow 200 involves a MFA OTP or a derivative thereof, although it will be appreciated that any suitable MFA process may be utilized accordingly. An MFA function responsible for generating a MFA OTP may be located in home network 130 or IDP 140. Thus, management function 170 may initiate the MFA process locally or using IDP 140. If management function 170 initiates the MFA process locally, management function 170 may generate the MFA OTP for the SUPI of UE 110. If management function 170 initiates the MFA process using IDP 140, as shown at 230, management function 170 may provide a request to IDP 140 to generate the MFA OTP for the SUPI of UE 110 and may in response obtain the MFA OTP from IDP 140.

At 235, management function 170 (e.g., the UDM/ARPF) generates an authentication vector of the mobile security protocol. The authentication vector includes an indication that UE 110 is to be authenticated using the MFA process. Here, the mobile security protocol is 5G-AKA, and the authentication vector includes an authentication token including the indication that UE 110 is to be authenticated using the MFA process. In particular, the authentication token may include a bit, claim, or some other identifier indicating that UE 110 is to be authenticated using the MFA process. The particular mechanism used to indicate that UE 110 is to be authenticated using the MFA process may depend on the exact construction of the authentication token. The authentication vector may further include an Expected Response (XRES), which is the response that SIM 150 is expected to provide in response to an MFA prompt. In one example, the MFA prompt is the OTP, and the XRES is the OTP itself, or a mathematical derivative of the OTP and/or a standard response that SIM 150 would have presented in the absence of MFA.

At 240, management function 170 provides the authentication vector to authentication function 180. At 245, authentication function 180 converts the XRES to a Hash XRES (HXRES). At 250, authentication function 180 provides the authentication vector to SEAF 160 to prompt a Response (RES) from UE 110 that is in accordance with the MFA process. At 255, SEAF 160 provides an authentication request to SIM 150. The authentication request may include a challenge for authentication that prompts UE 110 to provide the OTP for MFA. The authentication request may also carry additional information such as source of MFA (e.g., Google Authenticator, Yubikey, DUO, text message, etc.) to obtain the OTP from. The user may be expected to know where/how to obtain the MFA prompt. UE 110 may generate a prompt that is specific to the UE/USIM platform.

At 260, SIM 150 may obtain the OTP, for example, via an SMS message. At 265, SIM 150 may provide the OTP to SEAF 160 as a RES to the authentication request. At 270, SEAF 160 calculates a Hash RES (HRES) from the RES and compares the HRES to the HXRES. If the HRES and the HXRES match, SEAF 160 considers the authentication successful from the point of view of serving network 120. At 275, authentication function 180 obtains the RES from SEAF 160. At 280, authentication function 180 authenticates UE 110 based on the RES. In one example, authentication function 180 compares the RES to the XRES and verifies that the RES and the XRES match. At 285, authentication function 180 provides an authentication result to SEAF 160, thereby authenticating UE 110 to serving network 120.

Figure 3:
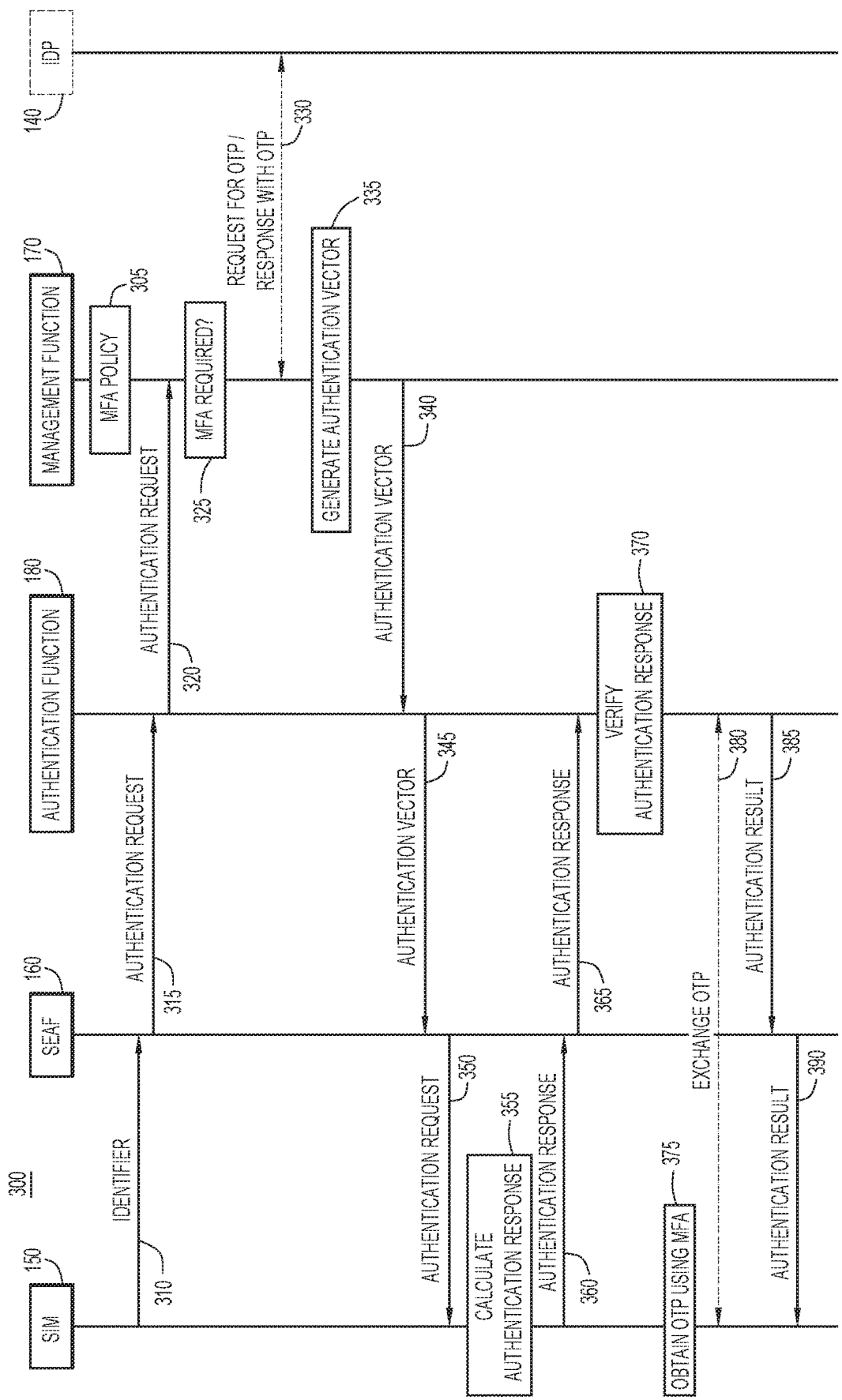
FIG. 3 illustrates a call flow for MFA integrated with Extensible Authentication Protocol-AKA' (EAP-AKA') mobile security protocol, according to an example embodiment.

Turning now to FIG. 3, and with continued reference to FIG. 1, shown is an example call flow 300 for MFA integrated with the EAP-AKA' mobile security protocol. Operations described in reference to FIG. 3 may be similar to corresponding operations described above in reference to FIG. 2. At 305, an MFA policy is defined at management function 170. At 310, SIM 150 provides, to SEAF 160, an identifier of UE 110 (e.g., a SUCI). At 315, authentication function 180 obtains, from SEAF 160, an authentication request to authenticate UE 110 to serving network 120. At 320, management function 170 obtains the authentication request from authentication function 180. At 325, management function 170 determines whether UE 110 is to be authenticated using the MFA process. Management function 170 may further select the appropriate mobile security protocol (here, EAP-AKA'). Based on the SUPI, EAP-AKA', and MFA policy, management function 170 may determine whether UE 110 is to be authenticated using the MFA process (e.g., whether to enforce the MFA on UE 110).

In this example, management function 170 determines that UE 110 is to be authenticated using the MFA process and may initiate the MFA process. Management function 170 may initiate the MFA process locally or using IDP 140. If management function 170 initiates the MFA process using IDP 140, as shown at 330, management function 170 may provide a request to IDP 140 to generate the MFA OTP for the SUPI of UE 110 and may in response obtain the MFA OTP from IDP 140. At 335, management function 170 generates an authentication vector of the mobile security protocol. The authentication vector includes an indication that UE 110 is to be authenticated using the MFA process. Here, the mobile security protocol is EAP-AKA', and the authentication vector includes an EAP request including the indication that UE 110 is to be authenticated using the MFA process.

At 340, management function 170 provides the authentication vector to authentication function 180. At 345, authentication function 180 provides the authentication vector to SEAF 160. SEAF 160 may verify an EAP response/AKA' challenge and, at 350, provide an authentication request to SIM 150 that includes the EAP response/AKA' challenge. The authentication request may include a challenge for SIM 150 to provide an OTP for MFA over EAP messages. At 355, SIM 150 calculates an authentication response for the EAP response/AKA' challenge and, at 360, provides the authentication response to SEAF 160. At 365, SEAF 160 provides the authentication response to authentication function 180. At 370, authentication function 180 verifies the authentication response.

At 375, SIM 150 may obtain the OTP, for example, via SMS. At 380, SIM 150 exchanges the OTP with authentication function 180 using EAP messages. For example, authentication function 180 may obtain an MFA response (e.g., the OTP). Authentication function 180 authenticates UE 110 based on the response, for example, by verifying the OTP to generate an authentication result. At 385, authentication function 180 provides the authentication result to SEAF 160, thereby authenticating UE 110 to serving network 120. At 390, SEAF 160 provides the authentication result to SIM 150.

Figure 4:
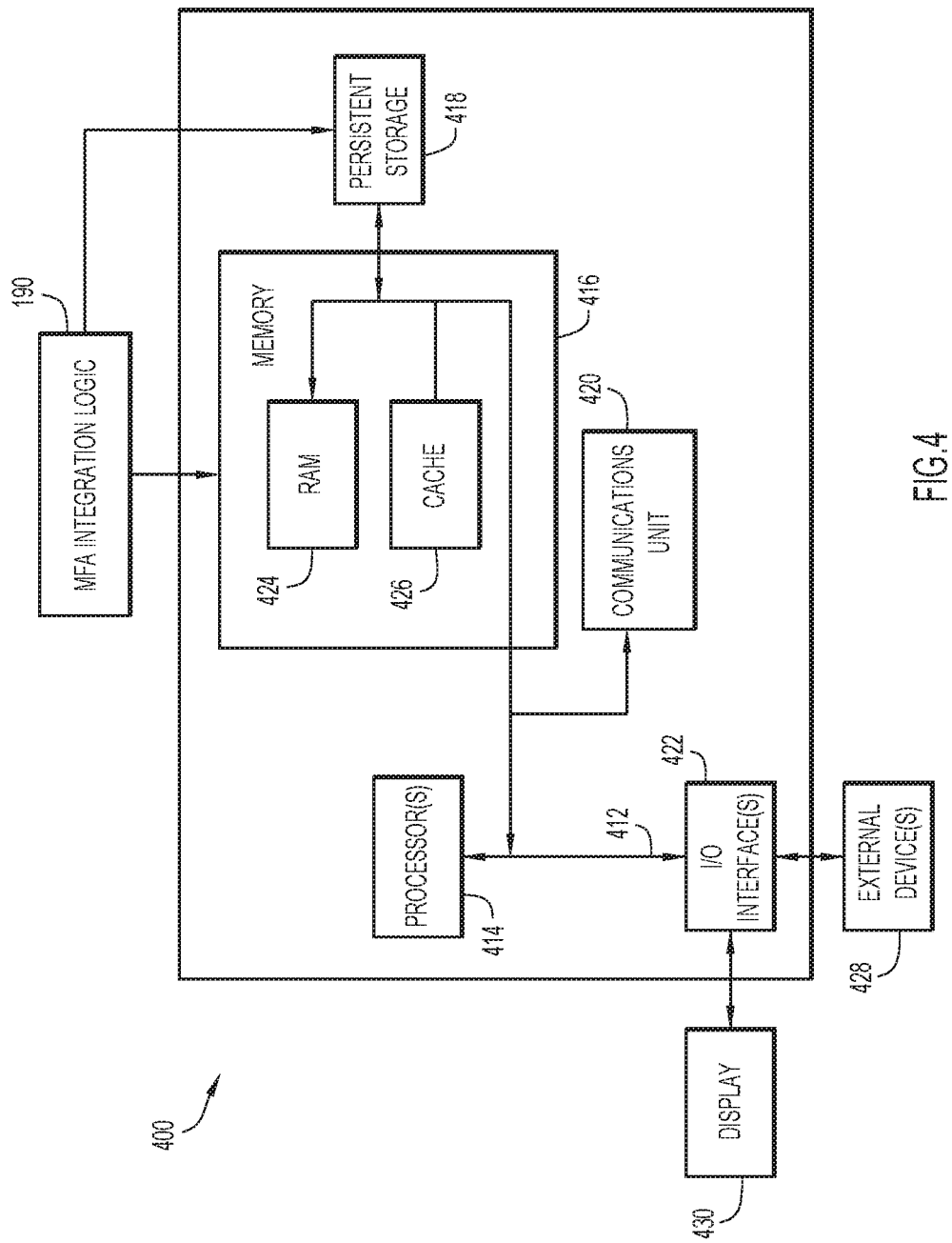
FIG. 4 illustrates a block diagram of a computing device configured to integrate MFA with a mobile security protocol, according to an example embodiment.

FIG. 4 illustrates a hardware block diagram of an example device 400 (e.g., a computing device (such as a server) of home network 130) that performs the operations of the management function 170 and MFA integration logic 190. It should be appreciated that FIG. 4 provides only an illustration of one embodiment and does not imply any limitations with regard to the environments in which different embodiments may be implemented. Many modifications to the depicted environment may be made.

As depicted, the device 400 includes a bus 412, which provides communications between computer processor(s) 414, memory 416, persistent storage 418, communications unit 420, and Input/Output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes Random Access Memory (RAM) 424 and cache memory 426. In general, memory 416 can include any suitable volatile or non-volatile computer readable storage media. Instructions for MFA integration logic 190 may be stored in memory 416 or persistent storage 418 for execution by computer processor(s) 414.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to device 400. For example, I/O interface(s) 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

Figure 5:
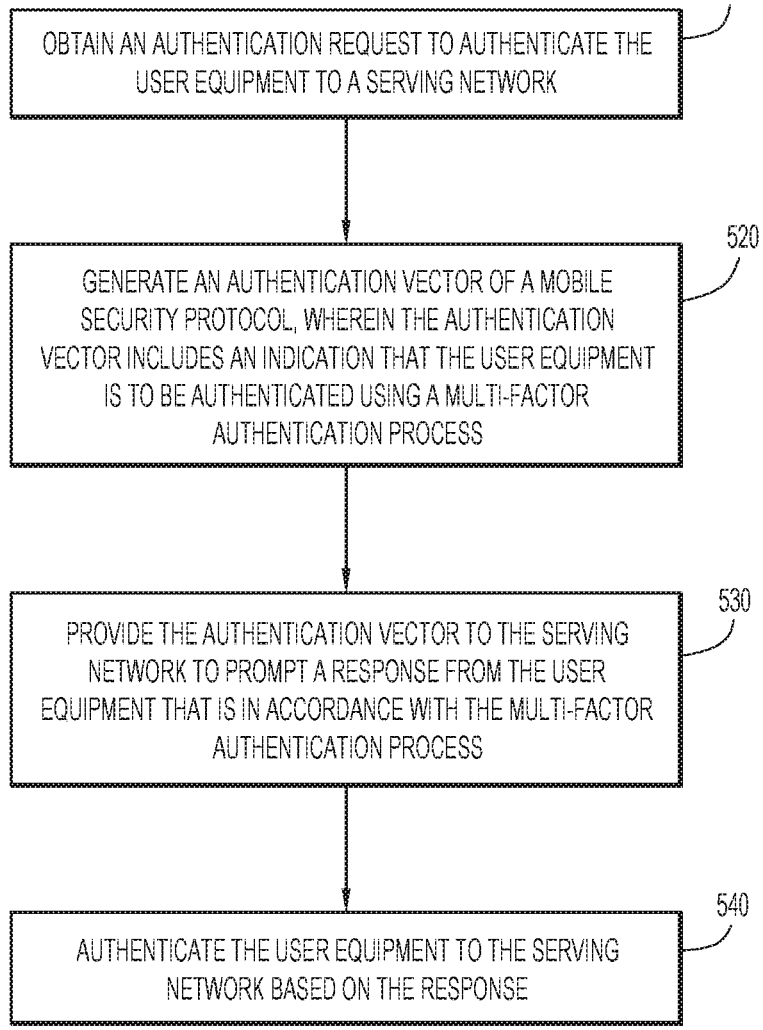
FIG. 5 illustrates a flowchart of a method for integrating MFA with a mobile security protocol, according to an example embodiment.

FIG. 5 is a flowchart of an example method 500 for integrating MFA with a mobile security protocol. Method 500 may be performed at a home network (e.g., home network 130) associated with a user equipment (e.g., UE 110). At 510, the home network obtains an authentication request to authenticate the UE to a serving network. At 520, the home network generates an authentication vector of a mobile security protocol, wherein the authentication vector includes an indication that the UE is to be authenticated using a MFA process. At 530, the home network provides the authentication vector to the serving network to prompt a response from the user equipment that is in accordance with the multi-factor authentication process. At 540, the home network authenticates the UE to the serving network based on the response.

It will be appreciated that MFA techniques may be integrated in any suitable mobile security protocol, such as EAP Protected One-Time Password Protocol (EAP-POTP) or EAP Generic Token Card (EAP-GTC), in accordance with the techniques described herein.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: at a home network associated with a user equipment: obtaining an authentication request to authenticate the user equipment to a serving network; generating an authentication vector of a mobile security protocol, wherein the authentication vector includes an indication that the user equipment is to be authenticated using a multi-factor authentication process; providing the authentication vector to the serving network to prompt a response from the user equipment that is in accordance with the multi-factor authentication process; and authenticating the user equipment to the serving network based on the response.

In one example, obtaining the authentication request, generating the authentication vector, and providing the authentication vector are performed at a management function of the home network, and authenticating the user equipment is performed at an authentication function of the home network.

In one example, the method further comprises: at the home network: initiating the multi-factor authentication process using an identity provider entity. In another example, the method further comprises: at the home network: initiating the multi-factor authentication process locally.

In one example, generating the authentication vector includes generating the authentication vector based on a multi-factor authentication policy that indicates that any user equipment that is associated with a given enterprise is to be authenticated to the serving network using the multi-factor authentication process, wherein the user equipment is associated with the given enterprise.

In one example, generating the authentication vector includes generating the authentication vector based on a multi-factor authentication policy that indicates that any user equipment to be authenticated to the serving network, is to be authenticated to the serving network using the multi-factor authentication process.

In one example, generating the authentication vector includes generating the authentication vector based on a multi-factor authentication policy that indicates that the user equipment is to be authenticated to the serving network using the multi-factor authentication process at a given time or a given location, wherein the user equipment is to be authenticated to the serving network at the given time or the given location.

In one example, the multi-factor authentication process involves a multi-factor authentication one time password or a derivative of the multi-factor authentication one time password.

In one example, the mobile security protocol is a fifth generation cellular network technology authentication and key agreement (5G-AKA) protocol, and the authentication vector includes an authentication token including the indication that the user equipment is to be authenticated using the multi-factor authentication process.

In one example, the mobile security protocol is an extensible authentication protocol authentication and key agreement prime (EAP-AKA') protocol, and the authentication vector includes an EAP request including the indication that the user equipment is to be authenticated using the multi-factor authentication process In one example, the mobile security protocol is a mobile security protocol for a fifth generation cellular network technology.

In another form, an apparatus is provided. The apparatus comprises: a network interface configured to obtain or provide network communications; and one or more processors coupled to the network interface, wherein the one or more processors are configured to: obtain an authentication request to authenticate a user equipment to a serving network; generate an authentication vector of a mobile security protocol, wherein the authentication vector includes an indication that the user equipment is to be authenticated using a multi-factor authentication process; provide the authentication vector to the serving network to prompt a response from the user equipment that is in accordance with the multi-factor authentication process; and authenticate the user equipment to the serving network based on the response.

In another form, one or more non-transitory computer readable storage media are provided. The non-transitory computer readable storage media are encoded with instructions that, when executed by a processor, cause the processor to: obtain an authentication request to authenticate the user equipment to a serving network; generate an authentication vector of a mobile security protocol, wherein the authentication vector includes an indication that the user equipment is to be authenticated using a multi-factor authentication process; provide the authentication vector to the serving network to prompt a response from the user equipment that is in accordance with the multi-factor authentication process; and authenticate the user equipment to the serving network based on the response.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
at a home network associated with a user equipment, wherein the home network includes a unified data management entity and an authentication server function:
obtaining, at the unified data management entity, an authentication request to authenticate the user equipment to a serving network;
initiating a multi-factor authentication process using an identity provider entity configured to provide, to the unified data management entity, a multi-factor authentication one time password for a subscription permanent identifier of the user equipment;
generating, at the unified data management entity, an authentication vector of a mobile security protocol for a fifth generation cellular network technology, wherein the authentication vector includes an indication that the user equipment is to be authenticated using the multi-factor authentication process;
providing, at the unified data management entity, the authentication vector to the serving network to prompt a response from the user equipment that is in accordance with the multi-factor authentication process; and
authenticating, at the authentication server function, the user equipment to the serving network based on the response.

2. The method of claim 1, wherein generating the authentication vector includes generating the authentication vector based on a multi-factor authentication policy that indicates that any user equipment that is associated with a given enterprise is to be authenticated to the serving network using the multi-factor authentication process, wherein the user equipment is associated with the given enterprise.

3. The method of claim 1, wherein generating the authentication vector includes generating the authentication vector based on a multi-factor authentication policy that indicates that any user equipment to be authenticated to the serving network, is to be authenticated to the serving network using the multi-factor authentication process.

4. The method of claim 1, wherein generating the authentication vector includes generating the authentication vector based on a multi-factor authentication policy that indicates that the user equipment is to be authenticated to the serving network using the multi-factor authentication process at a given time, wherein the user equipment is to be authenticated to the serving network at the given time.

5. The method of claim 1, wherein the multi-factor authentication process involves the multi-factor authentication one time password or a derivative of the multi-factor authentication one time password.

6. The method of claim 1, wherein the mobile security protocol is a fifth generation cellular network technology authentication and key agreement (5G-AKA) protocol, and the authentication vector includes an authentication token including the indication that the user equipment is to be authenticated using the multi-factor authentication process.

7. The method of claim 1, wherein the mobile security protocol is an extensible authentication protocol authentication and key agreement prime (EAP-AKA') protocol, and the authentication vector includes an EAP request including the indication that the user equipment is to be authenticated using the multi-factor authentication process.

8. The method of claim 1, wherein the home network is a private enterprise network.

9. The method of claim 1, further comprising obtaining the authentication request from, and providing the authentication vector to, a security anchor function of the serving network.

10. A system comprising:
a unified data management entity of a home network associated with a user equipment; and
an authentication server function of the home network;
wherein the home network is configured to:
obtain, at the unified data management entity, an authentication request to authenticate the user equipment to a serving network;
initiate a multi-factor authentication process using an identity provider entity configured to provide, to the unified data management entity, a multi-factor authentication one time password for a subscription permanent identifier of the user equipment;
generate, at the unified data management entity, an authentication vector of a mobile security protocol for a fifth generation cellular network technology, wherein the authentication vector includes an indication that the user equipment is to be authenticated using the multi-factor authentication process;
provide, at the unified data management entity, the authentication vector to the serving network to prompt a response from the user equipment that is in accordance with the multi-factor authentication process; and
authenticate, at the authentication server function, the user equipment to the serving network based on the response.

11. The system of claim 10, wherein the home network is further configured to:
generate the authentication vector based on a multi-factor authentication policy that indicates that any user equipment that is associated with a given enterprise is to be authenticated to the serving network using the multi-factor authentication process, wherein the user equipment is associated with the given enterprise.

12. The system of claim 10, wherein the home network is further configured to:
generate the authentication vector based on a multi-factor authentication policy that indicates that any user equipment to be authenticated to the serving network, is to be authenticated to the serving network using the multi-factor authentication process.

13. The system of claim 10, wherein the home network is further configured to:
generate the authentication vector based on a multi-factor authentication policy that indicates that the user equipment is to be authenticated to the serving network using the multi-factor authentication process at a given time, wherein the user equipment is to be authenticated to the serving network at the given time.

14. The system of claim 10, wherein the multi-factor authentication process involves the multi-factor authentication one time password or a derivative of the multi-factor authentication one time password.

15. The system of claim 10, wherein the mobile security protocol is a fifth generation cellular network technology authentication and key agreement (5G-AKA) protocol, and the authentication vector includes an authentication token including the indication that the user equipment is to be authenticated using the multi-factor authentication process.

16. The system of claim 10, wherein the mobile security protocol is an extensible authentication protocol authentication and key agreement prime (EAP-AKA') protocol, and the authentication vector includes an EAP request including the indication that the user equipment is to be authenticated using the multi-factor authentication process.

17. One or more non-transitory computer readable storage media encoded with instructions that, when executed by a processor of a home network associated with a user equipment, wherein the home network includes a unified data management entity and an authentication server function, cause the processor to:
obtain, at the unified data management entity, an authentication request to authenticate a user equipment to a serving network;
initiate a multi-factor authentication process using an identity provider entity configured to provide, to the unified data management entity, a multi-factor authentication one time password for a subscription permanent identifier of the user equipment;
generate, at the unified data management entity, an authentication vector of a mobile security protocol for a fifth generation cellular network technology, wherein the authentication vector includes an indication that the user equipment is to be authenticated using the multi-factor authentication process;
provide, at the unified data management entity, the authentication vector to the serving network to prompt a response from the user equipment that is in accordance with the multi-factor authentication process; and authenticate, at the authentication server function, the user equipment to the serving network based on the response.

18. The one or more non-transitory computer readable storage media of claim 17, wherein the instructions further cause the processor to:
generate the authentication vector based on a multi-factor authentication policy that indicates that any user equipment that is associated with a given enterprise is to be authenticated to the serving network using the multi-factor authentication process, wherein the user equipment is associated with the given enterprise.

19. The one or more non-transitory computer readable storage media of claim 17, wherein the instructions further cause the processor to:
generate the authentication vector based on a multi-factor authentication policy that indicates that any user equipment to be authenticated to the serving network, is to be authenticated to the serving network using the multi-factor authentication process.

20. The one or more non-transitory computer readable storage media of claim 17, wherein the instructions further cause the processor to:
generate the authentication vector based on a multi-factor authentication policy that indicates that the user equipment is to be authenticated to the serving network using the multi-factor authentication process at a given time, wherein the user equipment is to be authenticated to the serving network at the given time.

\* \* \* \* \*